UNITED STATES PATENT OFFICE.

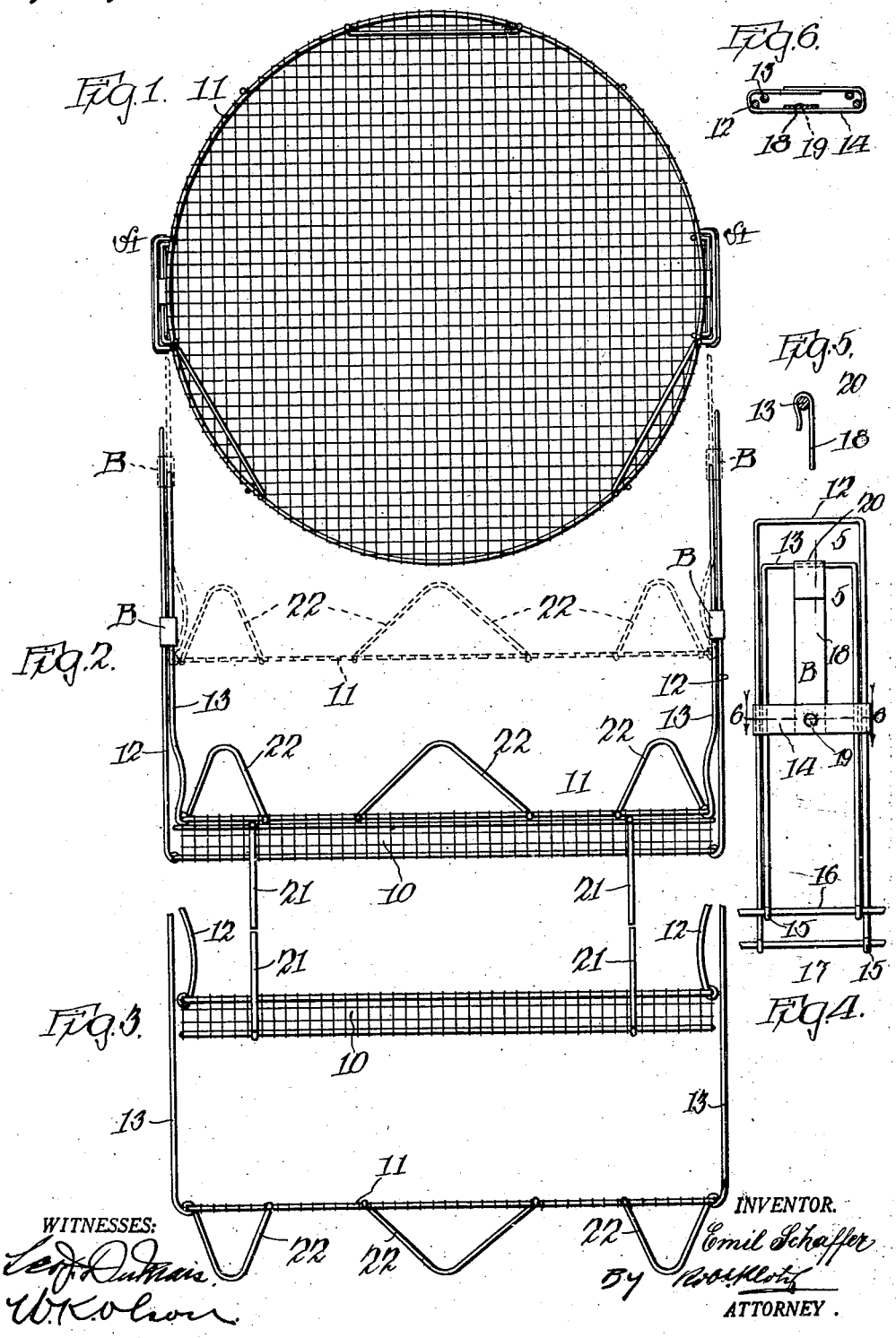

EMIL SCHAFFER, OF HOOPESTON, ILLINOIS.

COOKER.

1,250,360.
Specification of Letters Patent.
Patented Dec. 18, 1917.

Application filed January 22, 1917. Serial No. 143,674.

*To all whom it may concern:*

Be it known that EMIL SCHAFFER, a citizen of the United States, residing at Hoopeston, in the county of Vermilion and State of Illinois, has invented certain new and useful Improvements in Cookers, of which the following is a specification.

My invention relates to cookers, and has for its primary object the provision of an improved cooker which shall be invertible without loss of its contents, and which, in either upright or inverted position may be manipulated from above. A further object is the provision of means for maintaining the body of the cooker above the bottom of the vessel in which it is used.

A further object lies in the provision of a cooker which shall be light and easily handled, and which may be manufactured at a very low cost.

With the above and other objects in view, this invention consists substantially in the combination and arrangement of parts and in the details of construction hereinafter described and claimed.

In the accompanying drawings which form a part of this specification and illustrate the preferred embodiment of my invention, Figure 1 is a top plan view of the cooker; Fig. 2 is a side elevation thereof showing in dotted lines an elevated position of the cover; Fig. 3 is a side elevation showing the cooker inverted and open; Fig. 4 is a side elevation of one of the holding devices, the attached portions of the cooker being broken away; Fig. 5 is a section on line 5—5 of Fig. 4; and Fig. 6 is a section on line 6—6 of Fig. 4.

Reference numeral 10 indicates the body of the cooker which is commonly formed of wire and employed by bakers, for instance, in frying doughnuts. The cover is indicated at 11, and is adapted to fit closely against the adjacent edge of the body in order to retain within the cooker the doughnuts or other articles to be fried. In the use of such cooker it is desirable that, while retaining the articles being treated, the cooker shall be readily invertible in order that the articles may receive heat on opposite sides. It is further desirable that the cooker be provided with some means for lifting it from a position near the bottom of a vessel containing heated liquid. For these reasons, the cooker is provided with holding devices generally indicated by letter A. Preferably, these holding devices are secured to the sides of the cooker at opposite points. Each holding device comprises a body-handle 12 and a cover-handle 13 which are, respectively, joined to the body and cover in such manner that they may be reversed with respect to the body and cover in order to point either upward or downward. These handles lie substantially parallel to each other but are bent slightly to permit free movement through an angle of 180 degrees with respect to the body of the cooker, and this bending is sufficient to enable them to be held in fixed relation by means of a clamp B, shown in details in Figs. 4, 5, and 6. This clamp comprises a horizontal strip 14 which embraces all four rods of the handles 12 and 13, it being understood that these handles are formed of inverted wire U members formed at their ends with loops 15 for pivotal engagement with the free members 16 and 17 of the cover and body, respectively. The clamp is maintained in proper position when the cover is in closing engagement with the body by means of an upwardly extending strip 18 which is riveted at 19 to the horizontal strip 14, and is provided with a bend 20 at its upper end, by means of which it is snapped upon the upper horizontal portion of handle 13 while being readily removable at will.

Depending from the body 10 are a plurality of legs 21. preferably formed of wire, by means of which the cooker is maintained above the bottom of the vessel containing the grease. The cover is provided with wire legs 22 which, when the cooker is inverted, perform the same function as the legs 21 of the body. In the use of my invention such articles as doughnuts, for instance, are placed in the body of the cooker, and the cooker is inserted in a vessel of hot grease, occupying the position shown in full lines in Fig. 2. In this position the handles 12 and 13 extend vertically from opposite sides of the cooker and the clamp B is placed in the full line position shown in Figs. 2 and 4, thus holding the handles 12 and 13 in fixed relation. As the handles are respectively joined to the body and cover it follows that during the cooking process the cover 11 is maintained in fixed relation to the body 10 by means of the clamp B. When it is desired to turn the doughnuts over, the cooker is withdrawn from the vessel (not shown) and the cover 11 is elevated to the dotted line position of Fig. 2, following which the clamps B are removed from the handles, the cover returned to the body, and the handles turned, with respect to the body and cover, through an angle of 180 degrees. The clamps B are now forced from the free ends of the handles toward the cooker until the bend 20 snaps over the horizontal portion of the handle 13. The handles 12 and 13 of each holding device are now clamped in fixed relation, and the cover 11 is now fixed with respect to the body 10 so that the contents of the cooker are inclosed. The cooker is then inverted into the position shown in Fig. 3, except that the cover and body are together. The cooker may be re-inserted in the vessel containing the grease, and the legs 22 will maintain at above the bottom of the vessel.

While I have illustrated and described a preferred embodiment of my invention, it should be understood that it is capable of variation without departing from the spirit of the invention. I, therefore, do not wish to be limited to the construction herein shown and described, except as the same is limited in the appended claims.

I claim as my invention:

1. In a cooker, the combination with a body and a cover therefor, a plurality of spaced-holding devices for the cooker, each of which comprises an inverted U-shaped member forming a reversible handle joined to the body and extending vertically therefrom, a similar handle joined to the cover and substantially paralleling the body handle, and means for holding said handles in fixed relation comprising a substantially horizontal strip embracing said handles, and a substantially vertical strip joined to the horizontal strip and bent at its free end for engagement with the free end of the cover-handle.

2. In a cooker, the combination with a body and a cover therefor, a plurality of spaced-holding devices for the cooker, each of which comprises an inverted U-shaped member forming a reversible handle joined to the body and extending vertically therefrom, a similar handle joined to the cover and substantially paralleling the body handle, and removable means for holding said handles in fixed relation comprising a substantially horizontal strip embracing said handles and a substantially vertical strip joined to the horizontal strip and bent at its free end for engagement with the free end of the cover-handle.

In testimony whereof I affix my signature.

EMIL SCHAFFER.